Patented June 15, 1926.

1,588,753

UNITED STATES PATENT OFFICE.

HANS LANGER, OF BERLIN-CHARLOTTENBURG, GERMANY, ASSIGNOR TO ACTIEN GESELLSCHAFT FÜR ANILIN FABRIKATION, OF BERLIN, GERMANY.

PHARMACEUTICAL PRODUCT.

No Drawing. Application filed June 17, 1924, Serial No. 720,699, and in Germany October 20, 1923.

Compounds of hexamethylenetetramine and hydrochloric acid are unknown and it is impossible to prepare stable solutions of hexamethylenetetramine containing hydrochloric acid as hexamethylenetetramine soon is destroyed under such conditions. But the effect of hexamethylenetetramine as disinfectant for urinary organs is increased if besides it a hydrohalogenic acid is taken. Therefore, it is desirable to combine hexamethylenetetramine with hydrohalogenic acid.

According to the invention stable pharmaceutical products are obtained, acting when used as hexamethylenetetramine and a hydrohalogenic acid. They consist of a mixture containing hexamethylenetetramine and a halide of an amino fatty acid compound. These mixtures of hexamethylenetetramine and halides of amino fatty acids, for example glycocoll, alanine, as well as their derivatives, such as their lactams and esters, may be kept in the dry state, in the form of powder and equally compressed, without decomposition. Instead of hexamethylenetetramine its salts may be employed and to the mixtures other materials may be added.

In order to illustrate in what manner the preparations are made up the following examples are given, without limiting the invention, the parts being by weight:

1. 1 part of hexamethylenetetramine and 1 part of alanine hydrochloride are mixed.
2. 1 part of hexamethylenetetramine and 3 parts of betaine hydrobromide are equally mixed. From the powder tablets may be pressed.
3. 1 part of hexamethylenetetramine and 2 to 4 parts of betaine-hydrochloride are mixed.
4. 3 parts of hexamethylenetetramine, 3 parts of lactose and 8 parts of betaine hydrochloride are mixed together.
5. 1 part of hexamethylenetetraminetriborate is mixed with 2 parts of betaine hydrochloride.
6. 1 part of hexamethylenetetraminesulfosalicylate is mixed with 2 parts of betaine-hydrochloride.

Having now described my invention what I claim is,—

1. Pharmaceutical product consisting of a mixture containing hexamethylenetetramine and a hydrohalogenide of an amino fatty acid compound.
2. Pharmaceutical product consisting of a mixture containing hexamethylenetetramine and a halogenide of an amino fatty acid lactam.
3. Pharmaceutical product consisting of a mixture containing hexamethylenetetramine and a hydrohalogenide of betaine.
4. Pharmaceutical product consisting of a mixture containing hexamethylenetetramine and betaine hydrochloride.

In testimony whereof I affix my signature.

HANS LANGER.